(12) United States Patent
Burton, Jr. et al.

(10) Patent No.: US 7,063,828 B2
(45) Date of Patent: Jun. 20, 2006

(54) MOLECULAR SIEVE SSZ-47B HAVING HIGH MICROPORE VOLUME AND SYNTHESIS THEREOF

(75) Inventors: Allen W. Burton, Jr., Richmond, CA (US); Stacey I. Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 9 days.

(21) Appl. No.: 10/745,893

(22) Filed: Dec. 23, 2003

(65) Prior Publication Data

US 2005/0136000 A1    Jun. 23, 2005

(51) Int. Cl.
*C01B 39/48* (2006.01)
(52) U.S. Cl. .................. 423/706; 423/708; 423/718
(58) Field of Classification Search ............ 423/718, 423/706, 708
See application file for complete search history.

(56) References Cited

U.S. PATENT DOCUMENTS

| | | | | |
|---|---|---|---|---|
| 4,537,754 A | * | 8/1985 | Casci et al. | 423/708 |
| 5,385,718 A | * | 1/1995 | Casci et al. | 423/718 |
| 5,591,421 A | * | 1/1997 | Zones | 423/706 |
| 5,628,978 A | * | 5/1997 | Tejada et al. | 423/705 |
| 5,785,947 A | | 7/1998 | Zones et al. | |
| 6,033,643 A | * | 3/2000 | Yuen et al. | 423/718 |
| 6,156,290 A | | 12/2000 | Lee et al. | |

* cited by examiner

*Primary Examiner*—David Sample
(74) *Attorney, Agent, or Firm*—Richard J. Sheridan (57) ABSTRACT

The present invention relates to new crystalline molecular sieve SSZ-47B prepared using a N-cyclopentyl-1,4-diazabicyclo[2.2.2]octane cation as a structure-directing agent and an amine too large to fit in the pores of the molecular sieve nonasil, methods for synthesizing SSZ-47B and processes employing SSZ-47B in a catalyst.

22 Claims, 3 Drawing Sheets

MOLECULAR SIEVE SSZ-47B HAVING HIGH MICROPORE VOLUME AND SYNTHESIS THEREOF

BACKGROUND OF THE INVENTION

1. Field of the Invention

The present invention relates to crystalline molecular sieve SSZ-47B having high micropore volume and high catalytic activity, and a method for preparing such high micropore volume, highly active SSZ-47B using N-cyclopentyl-1,4-diazabicyclo[2.2.2]octane cation (referred to herein as "N-cyclopentyl DABCO cation") structure directing agent (SDA) in the presence of an amine too large to fit in the pores of the molecular sieve nonasil, a clathrasil material.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

SUMMARY OF THE INVENTION

The present invention is directed to a family of crystalline molecular sieves with unique properties, referred to herein as "molecular sieve SSZ-47B" or simply "SSZ-47B". Preferably, SSZ-47B is obtained in its silicate, aluminosilicate, titanosilicate, germanosilicate, vanadosilicate or borosilicate form. The term "silicate" refers to a molecular sieve having a high mole ratio of silicon oxide relative to aluminum oxide (or other metal oxide), preferably a mole ratio greater than 100, including molecular sieves comprised entirely of silicon oxide. As used herein, the term "aluminosilicate" refers to a molecular sieve containing both aluminum oxide and silicon oxide and the term "borosilicate" refers to a molecular sieve containing oxides of both boron and silicon.

Molecular sieves, including zeolites, are typically synthesized by using a structure directing agent ("SDA", sometimes called a templating agent) in the reaction mixture used to make the molecular sieve. The SDA is believed to "direct" the formation of the molecular sieve's crystal structure as the pores of the molecular sieve form. As such, the SDA must be small enough to fit within the pores of the desired molecular sieve.

U.S. Pat. No. 6,156,290, issued Dec. 5, 2000 to Lee et al., discloses zeolite SSZ-47 and a method of making it using a 3(trimethylammonium)-bicyclo[3.2.1]octane ammonium cation or N,N-dimethyl-3-azoniabicyclo[4.2.1]nonane cation as an SDA. However, when each of these cations alone is used as the SDA, significant amounts of nonasil can form as an intergrowth in the crystal structure of the SSZ-47.

U.S. Pat. No. 5,785,947, issued Jul. 28, 1998 to Zones et al., discloses the preparation of zeolites using a small quantity of an SDA and a larger quantity of an amine component containing at least one amine having from one to eight carbon atoms, ammonium hydroxide or mixtures thereof. It is believed that the amines disclosed in U.S. Pat. No. 5,785,947 are all small enough to fit in the pores of nonasil and, therefore, would not prevent the intergrowth of nonasil during the preparation of SSZ-47B.

It has now been found that SSZ-47B can be synthesized while preventing the formation of nonasil intergrowth. This is accomplished by including in the reaction mixture, along with the SDA, a neutral amine that is too large to fit in the pores of nonasil. Preferably, the amine is also small enough to fit in the pores of SSZ-47B. In addition to preventing the formation of nonasil intergrowth, it has been discovered that the SSZ-47B made in accordance with this invention has a micropore volume and catalytic activity approximately double that of the SSZ-47 disclosed in Lee et al.

The diffraction patterns of SSZ-47 and SSZ-47B share similar features with those of the NON/EUO/NES family of zeolites. The powder diffraction patterns of SSZ-47 possess a combination of sharp and broad peaks that are often observed in the powder XRD patterns of disordered or intergrown materials. The diffraction patterns of SSZ-47 exhibit a peak at about 9.5° 2θ which is very close to the 111 peak of nonasil (NON), a clathrasil material with no accessible micropore volume. The intensity and position of this peak vary among different preparations of SSZ-47. However, in contrast with nonasil-type materials, these samples of SSZ-47 possess micropore volumes of 0.06–0.08. This measured micropore volume is lower than those typically measured for medium or large pore zeolites. As the relative intensity of the peak near 9.5° 2θ increases, the measured micropore volume (among different preparations) of the SSZ-47 material decreases. These data are consistent with an increase in the fraction of nonasil or other clathrasil-like domains within the zeolite. These data suggest SSZ-47 may contain clathrasil-like domains intergrown with EUO- and/or NES-type domains or with domains of other 10-ring and/or 12-ring pore zeolites.

The samples of SSZ-47 are prepared using a combination of a quaternary ammonium compound and isobutylamine as structure directing agents. When these samples are calcined in the presence of oxygen, the resulting materials are often discolored. This result indicates there may be organic molecules occluded within cage structures that do not allow access to small molecules such as oxygen. The largest dimensions of the nonasil cage parallel to the orthorhombic axes of the crystal structure are 8.9 (y-axis)×8.4 (x-axis)×6.5 Å (z-axis). These dimensions are determined by subtracting the ionic radii of the oxygen atoms (1.35 Å) from the distances between the centers of opposing oxygen atoms. Since the dimensions of the quaternary ammonium compounds are too large to allow their occlusion within nonasil-type cages, it is likely that the smaller isobutylamine molecules are occluded within these small cages. This suggests that amines too large to fit within a nonasil cage may prevent the creation of these cage structures if they are used in place of isobutylamine in the zeolite syntheses. Since the nonasil cages are not accessible to adsorbing molecules, elimination of the nonasil domains might improve the adsorption or catalytic properties of the material.

It has been found that molecular sieves can be synthesized using a combination of quaternary ammonium compounds with a large, neutral amine. Although the diffraction patterns of these materials are similar to those of SSZ-47, they do not possess the 111 peak of nonasil and the measured micropore volumes of these materials are appreciably greater than those of SSZ-47. These improved materials collectively are referred to herein as "SSZ-47B."

In accordance with the present invention, there is provided a molecular sieve having a mole ratio greater than about 15 of (1) an oxide of a first tetravalent element to (2) an oxide of a trivalent element, pentavalent element, second tetravalent element different from said first tetravalent element or mixture thereof having, after calcination, the X-ray diffraction lines of Table II.

The present invention further provides a molecular sieve having a mole ratio greater than about 15 of (1) an oxide of silicon, germanium or mixtures thereof to (2) an oxide of aluminum, gallium, iron, boron, titanium, indium, vanadium or mixtures thereof having, after calcination, the X-ray diffraction lines of Table II. The present invention also provides such a molecule sieve having a micropore volume of at least 0.10. Further provided is such a molecular sieve having a Constraint Index of less than or equal to 2.0.

For high catalytic activity, the SSZ-47B molecular sieve should be predominantly in its hydrogen ion form. It is preferred that, after calcination, at least 80% of the cation sites are occupied by hydrogen ions and/or rare earth ions. As used herein, "predominantly in the hydrogen form" means that, after calcination, at least 80% of the cation sites are occupied by hydrogen ions and/or rare earth ions.

Further provided by the present invention is a molecular sieve having a composition, as synthesized and in the anhydrous state, in terms of mole ratios as follows:

| | |
|---|---|
| $YO_2/W_cO_d$ | >15 |
| $M_{2/n}/YO_2$ | 0.01–0.03 |
| $Q/YO_2$ | 0.02–0.05 |
| Amine/$YO_2$ | 0.01–0.05 | wherein Y is silicon, germanium or a mixture thereof; W is aluminum, gallium, iron, boron, titanium, indium, vanadium or mixtures thereof; c is 1 or 2; d is 2 when c is 1 or d is 3 or 5 when c is 2; M is an alkali metal cation, alkaline earth metal cation or mixtures thereof; n is the valence of M; and Q is a N-cyclopentyl-1,4-diazabicyclo[2.2.2]octane cation, and Amine is an amine too large to fit in the pores of the molecular sieve nonasil. Preferably, Amine is also small enough to fit in the pores of the molecular sieve Further provided by the present invention is a method of preparing a crystalline material having, after calcination, the X-ray diffraction lines of Table II comprising (1) an oxide of a first tetravalent element and (2) an oxide of a trivalent element, pentavalent element, second tetravalent element which is different from said first tetravalent element or mixture thereof and having a mole ratio of the first oxide to the second oxide greater than 15, said method comprising contacting under crystallization conditions sources of said oxides and a N-cyclopentyl-1,4-diazabicyclo[2.2.2]octane cation and an amine too large to fit in the pores of the molecular sieve nonasil. Preferably, the amine is also small enough to fit in the pores of the crystalline material.

DETAILED DESCRIPTION OF THE INVENTION

Figure 1:
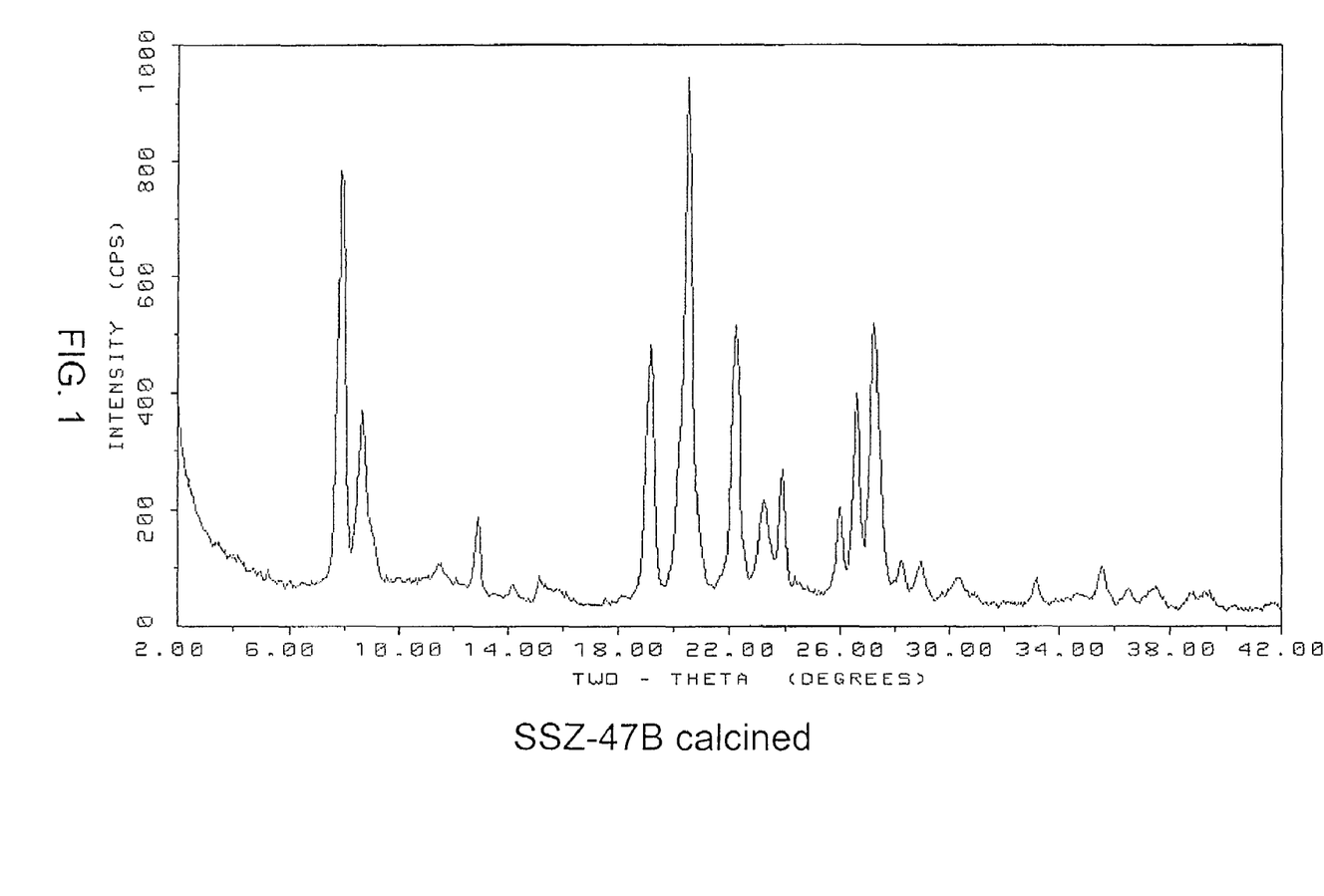
FIG. 1 is an X-ray diffraction pattern of SSZ-47B after it has been calcined.
Figure 2:
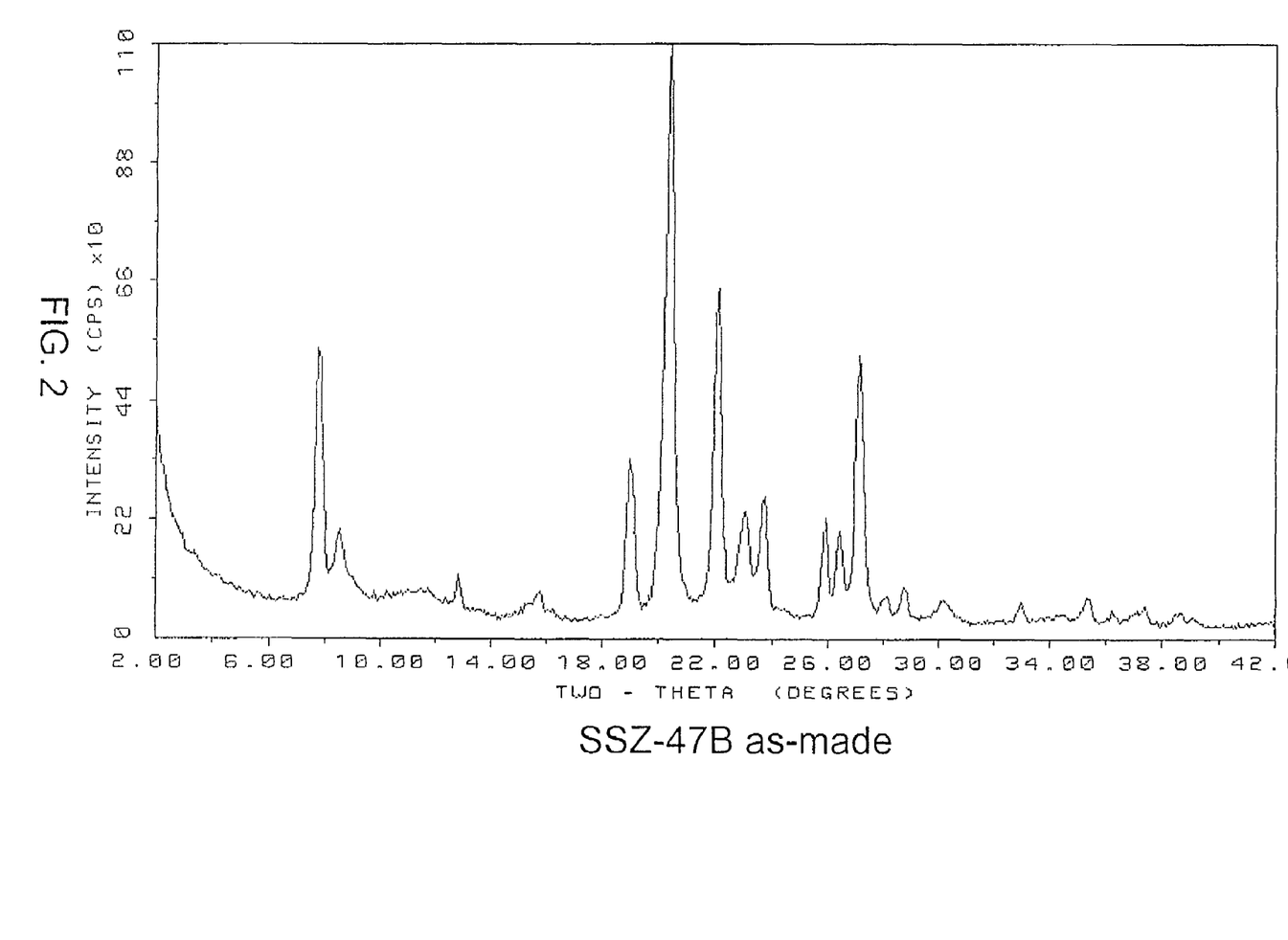
FIG. 2 is an X-ray diffraction pattern of SSZ-47B in the as-made form, i.e., prior to removal of the SDA from SSZ-47B.
Figure 3:
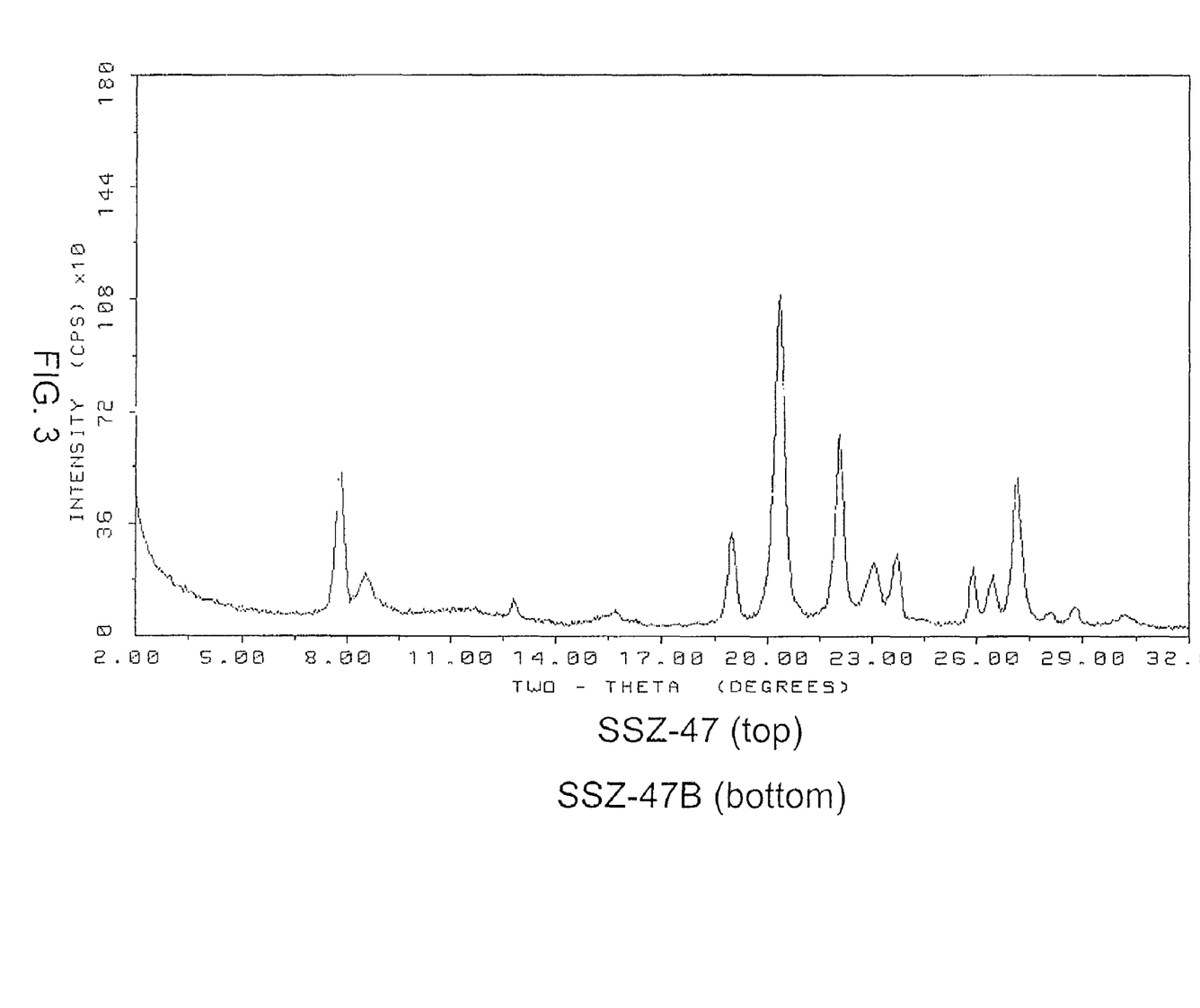
FIG. 3 shows two X-ray diffraction patterns, the top one being SSZ-47 and the bottom one being SSZ-47B.

The present invention comprises a family of crystalline, large pore molecular sieves designated herein "molecular sieve SSZ-47B" or simply "SSZ-47B". As used herein, the term "large pore" means having an average pore size diameter greater than about 6.0 Angstroms, preferably from about 6.5 Angstroms to about 7.5 Angstroms.

In preparing SSZ-47B, a N-cyclopentyl DABCO cation is used as a structure directing agent ("SDA"), also known as a crystallization template. The N-cyclopentyl DABCO cation has the following structure:

N-cyclopentyl DABCO cation can be prepared as described in U.S. Pat. No. 6,033,643, issued Mar. 7, 2000 to Yuen et al., which is incorporated by reference in its entirety.

The SDA cation is associated with an anion ($X^-$) which may be any anion that is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

The amine used in combination with the N-cyclopentyl DABCO SDA is large enough that it will not fit in the pores of the molecular sieve nonasil. Preferably, it is also small enough that it does fit in the pores of SSZ-47B. An example of such an amine is 4,4'-trimethylene dipiperidine which has the structure 4,4'-trimethylene dipiperidine In general, SSZ-47B is prepared by contacting an active source of one or more oxides selected from the group consisting of monovalent element oxides, divalent element oxides, trivalent element oxides, tetravalent element oxides and/or pentavalent elements with the SDA and amine.

SSZ-47B is prepared from a reaction mixture having the composition shown in Table A below.

TABLE A

| | Reaction Mixture | |
|---|---|---|
| | Typical | Preferred |
| $YO_2/W_aO_b$ | >15 | 30–70 |
| $OH^-/YO_2$ | 0.10–0.50 | 0.20–0.30 |
| $Q/YO_2$ | 0.05–0.50 | 0.10–0.20 |
| $M_{2/n}/YO_2$ | 0.02–0.40 | 0.10–0.25 |
| $H_2O/YO_2$ | 30–80 | 35–45 |
| Amine/$YO_2$ | 0.05–0.50 | 0.10–0.20 | where Y, W, Q, M, n and Amine are as defined above, and a is 1 or 2, and b is 2 when a is 1 (i.e., W is tetravalent) and b is 3 when a is 2 (i.e., W is trivalent).

In practice, SSZ-47B is prepared by a process comprising:
(a) preparing an aqueous solution containing sources of at least one oxide capable of forming a crystalline molecular sieve, a N-cyclopentyl DABCO cation having an anionic counterion which is not detrimental to the formation of SSZ-47B, and an amine too large to fit in the pores of the molecular sieve nonasil;
(b) maintaining the aqueous solution under conditions sufficient to form crystals of SSZ-47B; and
(c) recovering the crystals of SSZ-47B.

Accordingly, SSZ-47B may comprise the crystalline material, the SDA and the amine in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a trivalent element(s), pentavalent element(s), second tetravalent element(s) different from the first tetravalent element(s) or mixture thereof. The first tetravalent element(s) is preferably selected from the group consisting of silicon, germanium and combinations thereof. More preferably, the first tetravalent element is silicon. The trivalent element, pentavalent element and second tetravalent element (which is different from the first tetravalent element) is preferably selected from the group consisting of aluminum, gallium, iron, boron, titanium, indium, vanadium and combinations thereof. More preferably, the second trivalent or tetravalent element is aluminum or boron.

Typical sources of aluminum oxide for the reaction mixture include aluminates, alumina, aluminum colloids, aluminum oxide coated on silica sol, hydrated alumina gels such as Al(OH)$_3$ and aluminum compounds such as AlCl$_3$ and Al$_2$(SO$_4$)$_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, indium, vanadium and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The SDA may be used to provide hydroxide ion. Thus, it may be beneficial to ion exchange, for example, the halide to hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-47B are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the molecular sieve is prepared using mild stirring or agitation.

During the hydrothermal crystallization step, the SSZ-47B crystals can be allowed to nucleate spontaneously from the reaction mixture. The use of SSZ-47B crystals as seed material can be advantageous in decreasing the time necessary for complete crystallization to occur. In addition, seeding can lead to an increased purity of the product obtained by promoting the nucleation and/or formation of SSZ-47B over any undesired phases. When used as seeds, SSZ-47B crystals are added in an amount between 0.1 and 10% of the weight of first tetravalent element oxide, e.g. silica, used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-47B crystals. The drying step can be performed at atmospheric pressure or under vacuum.

SSZ-47B as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 15, and has, after calcination, the X-ray diffraction lines of Table II below. SSZ-47B further has a composition, as synthesized (i.e., prior to removal of the SDA from the SSZ-47B) and in the anhydrous state, in terms of mole ratios, shown in Table B below.

TABLE B

| As-Synthesized SSZ-47B | |
|---|---|
| YO$_2$/W$_c$O$_d$ | >15 |
| M$_{2/n}$/YO$_2$ | 0.01–0.03 |
| Q/YO$_2$ | 0.02–0.05 |
| Amine/YO$_2$ | 0.01–0.05 | where Y, W, c, d, M, n, Q and Amine are as defined above.

$^{13}$C MASNMR analysis of as-synthesized SSZ-47B provides evidence that the as-synthesized SSZ-47B contains both the N-cyclopentyl DABCO SDA and the amine inside the molecular sieve. This is also evidence that the amine is small enough to fit in the pores of SSZ-47B.

SSZ-47B can be made with a mole ratio of YO$_2$/W$_c$O$_d$ of ∞, i.e., there is essentially no W$_c$O$_d$ present in the SSZ-47B. In this case, the SSZ-47B would be an all-silica material or a germanosilicate. Thus, in a typical case where oxides of silicon and aluminum are used, SSZ-47B can be made essentially aluminum free, i.e., having a silica to alumina mole ratio of ∞. A method of increasing the mole ratio of silica to alumina is by using standard acid leaching or chelating treatments. Essentially aluminum-free SSZ-47B can be synthesized using essentially aluminum-free silicon sources as the main tetrahedral metal oxide component in the presence of boron. The boron can then be removed, if desired, by treating the borosilicate SSZ-47B with acetic acid at elevated temperature (as described in Jones et al., Chem. Mater., 2001, 13, 1041–1050) to produce an all-silica version of SSZ-47B. SSZ-47B can also be prepared directly as a borosilicate. If desired, the boron can be removed as described above and replaced with metal atoms by techniques known in the art to make, e.g., an aluminosilicate version of SSZ-47B. SSZ-47B can also be prepared directly as an aluminosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

SSZ-47B, as-synthesized, has a crystalline structure whose X-ray powder diffraction pattern exhibit the characteristic lines shown in Table I and is thereby distinguished from other molecular sieves.

TABLE I

As-Synthesized SSZ-47B

| 2 Theta[a] | d-spacing (Angstroms) | Relative Intensity (%)[b] |
|---|---|---|
| 7.80 | 11.3 | S |
| 8.54 | 10.4 | W–M |
| 19.02 | 4.67 | M |
| 20.36 | 4.36 | VS |
| 22.10 | 4.02 | S–VS |
| 23.06 | 3.86 | M |
| 23.74 | 3.75 | M |
| 25.92 | 3.44 | W–M |
| 26.46 | 3.37 | W |
| 27.10 | 3.29 | S |

[a] ±0.1
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

Table IA below shows the X-ray powder diffraction lines for as-synthesized SSZ-47B including actual relative intensities.

TABLE IA

| 2 Theta[a] | d-spacing (Angstroms) | Relative Intensity (%) |
|---|---|---|
| 7.80 | 11.3 | 49 |
| 8.54 | 10.4 | 19 |
| 12.82 | 6.91 | 11 |
| 15.74 | 5.63 | 8 |
| 19.02 | 4.67 | 30 |
| 20.36 | 4.36 | 100 |
| 22.10 | 4.02 | 59 |
| 23.06 | 3.86 | 22 |
| 23.74 | 3.75 | 24 |
| 25.92 | 3.44 | 20 |
| 26.46 | 3.37 | 18 |
| 27.10 | 3.29 | 48 |
| 28.10 | 3.18 | 7 |
| 28.76 | 3.10 | 9 |
| 30.22 | 2.96 | 6 |
| 32.98 | 2.72 | 6 |
| 35.42 | 2.53 | 7 |
| 36.22 | 2.48 | 5 |
| 36.99 | 2.43 | 2 |
| 37.34 | 2.41 | 5 |
| 38.72 | 2.33 | 5 |
| 39.08 | 2.30 | 4 |

[a] ±0.1

After calcination, the SSZ-47B molecular sieves have a crystalline structure whose X-ray powder diffraction pattern include the characteristic lines shown in Table II:

TABLE II

Calcined SSZ-47B

| 2 Theta[a] | d-spacing (Angstroms) | Relative Intensity (%) |
|---|---|---|
| 7.91 | 11.18 | S |
| 8.68 | 10.19 | M |
| 19.14 | 4.64 | M–S |
| 20.51 | 4.33 | VS |
| 22.23 | 4.00 | S |
| 23.27 | 3.82 | M |
| 23.9 | 3.72 | W |
| 26 | 3.43 | W |
| 26.62 | 3.35 | M |
| 27.26 | 3.27 | S |

[a] ±0.1

Table IIA below shows the X-ray powder diffraction lines for calcined SSZ-47B including actual relative intensities.

TABLE IIA

| 2 Theta[a] | d-spacing (Angstroms) | Relative Intensity (%) |
|---|---|---|
| 7.91 | 11.18 | 57.4 |
| 8.68 | 10.19 | 34.1 |
| 9.025 | 9.80 | 6.9 |
| 11.42 | 7.75 | 5.6 |
| 12.91 | 6.86 | 9.9 |
| 14.2 | 6..24 | 3.4 |
| 15.22 | 5.82 | 4.2 |
| 15.77 | 5.62 | 5.2 |
| 19.14 | 4.64 | 40.6 |
| 20.51 | 4.33 | 100.0 |
| 22.23 | 4.00 | 47.2 |
| 23.27 | 3.82 | 22.2 |
| 23.9 | 3.72 | 18.4 |
| 26 | 3.43 | 10.8 |
| 26.62 | 3.35 | 25.9 |
| 27.26 | 3.27 | 60.8 |
| 28.26 | 3.16 | 4.7 |
| 28.97 | 3.08 | 6.2 |
| 30.33 | 2.95 | 8.8 |
| 30.95 | 2.89 | 0.8 |
| 33.18 | 2.70 | 4.2 |
| 34.63 | 2.59 | 6.4 |
| 35.56 | 2.52 | 8.3 |
| 36.51 | 2.46 | 3.4 |
| 37.42 | 2.40 | 8.8 |

[a] ±0.1

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.1 degrees.

The X-ray diffraction pattern of Table I is representative of "as-synthesized" or "as-made" SSZ-47B molecular sieves. Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-47B are shown in Table II. Calcination can also result in changes in the intensities of the peaks as compared to patterns of the "as-made" material, as well as minor shifts in the diffraction pattern. The molecular sieve produced by exchanging the metal or other cations present in the molecular sieve with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-47B can be used as-synthesized, but preferably will be thermally treated (calcined). Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

The molecular sieve can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired.

Metals may also be introduced into the molecular sieve by replacing some of the cations in the molecular sieve with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-47B. The SSZ-47B can also be impregnated with the metals, or the metals can be physically and intimately admixed with the SSZ-47B using standard methods known to the art.

Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the molecular sieve is typically washed with water and dried at temperatures ranging from 65° C. to about 200° C. After washing, the molecular sieve can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-47B, the spatial arrangement of the atoms which form the basic crystal lattice of the molecular sieve remains essentially unchanged.

SSZ-47B can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-47B can be extruded before drying, or, dried or partially dried and then extruded.

SSZ-47B can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-47B is useful in catalysts for a variety of hydrocarbon conversion reactions such as hydrocracking, dewaxing, isomerization and the like.

EXAMPLES

The following examples demonstrate but do not limit the present invention.

Example 1

A reaction mixture is prepared in the Teflon cup of a Parr 23 ml reactor by combining the following: 2 millimoles (0.42 gram) of 4,4'-trimethylene dipiperidine, 1.0 millimole of N-cyclopentyl DABCO hydroxide in a total of 9.25 grams of water, 0.088 gram of Reheis F-2000 alumina (53–56 wt. % $Al_2O_3$), 3 grams of 1 N KOH and 0.90 gram of Cabosil M-5 fumed silica. The first two components represent the amine that is too large to form nonasil and the SDA that forms SSZ-47B, respectively. The reaction mixture is heated at 170° C. while being tumbled at 43 RPM. The reaction mixture has a silica/alumina mole ratio (SAR) of 32. The SSZ-47B product (identified by X-ray diffraction) forms after nine days.

Example 2

The reaction of Example 1 is repeated, except the alumina content is reduced to 0.066 gram. The SAR of the reaction mixture is 40. The reaction produces SSZ-47B (identified by X-ray diffraction).

Example 3

The reaction of Example 1 is repeated, except the alumina content is reduced to 0.044 gram. The SAR of the reaction mixture is 64. The reaction produces SSZ-47B with a little quartz impurity (identified by X-ray diffraction).

Example 4

The reaction of Example 1 is repeated, except the N-cyclopentyl DABCO hydroxide content is reduced to 0.5 millimole. The reaction produces SSZ-47B (identified by X-ray diffraction).

Example 5

The reaction of Example 4 is repeated, except that the reaction mixture is seeded with 2 wt. % (based on the weight of silica) SSZ-47B crystals from the product of Example 1. The reaction produces SSZ-47B (identified by X-ray diffraction).

Example 6

Calcination of SSZ-47B

SSZ-47B as synthesized in Example 3 is calcined to remove the structure directing agent (SDA) and amine. A thin bed of SSZ-47B in a calcination dish is heated in a muffle furnace from room temperature to 120° C. at a rate of 1° C./minute and held for 2 hours. Then, the temperature is ramped up to 540° C. at a rate of 1° C./minute and held for 5 hours. The temperature is ramped up again at 1° C./minute to 595° C. and held there for 5 hours. A 50/50 mixture of air and nitrogen passes through the muffle furnace at a rate of 20 standard cubic feet (0.57 standard cubic meters) per minute during the calcination process.

Example 7

Ammonium-Ion Exchange of SSZ-47B

The $Na^+$ form of SSZ-47B (prepared as in Example 3 or as in Example 5 and calcined as in Example 6) is converted to $NH_4^+$-SSZ-47B form by heating the material in an aqueous solution of $NH_4NO_3$ (typically 1 gm $NH_4NO_3$/1 gm SSZ-47B in 20 ml $H_2O$) at 90° C. for 2–3 hours. The mixture is then filtered and the obtained $NH_4$-exchanged-product is washed with de-ionized water and dried. The ion exchange procedure is repeated again. The $NH_4^+$ form of SSZ-47B can be converted to the $H^+$ form by calcination (as described in Example 6) to 540° C.

Example 8

Nitrogen Adsorption Analysis

The hydrogen form of the products of Example 3 (after a treatment as in Examples 6 and 7 is subjected to a micropore volume analysis using nitrogen as adsorbate and via the BET method. The micropore volume is 0.153 cc/g, thus exhibiting considerable void volume.

Example 9

Constraint Index

The hydrogen form of SSZ-47B of Example 3 (after treatment according to Examples 6 and 7) is pelletized at 3 KPSI, crushed and granulated to 20–40 mesh. A 0.6 gram sample of the granulated material is calcined in air at 540° C. for 4 hours and cooled in a desiccator to ensure dryness. Then, 0.5 gram is packed into a ⅜ inch stainless steel tube with alundum on both sides of the molecular sieve bed. A Lindburg furnace is used to heat the reactor tube. Helium is introduced into the reactor tube at 10 cc/min. and at atmospheric pressure. The reactor is heated to about 315° C., and a 50/50 feed of n-hexane and 3-methylpentane is introduced into the reactor at a rate of 8 μl/min. The feed is delivered by a Brownlee pump. Direct sampling into a GC begins after 10 minutes of feed introduction. The Constraint Index (CI) value is calculated from the GC data using methods known in the art. SSZ-47B has a CI of 1.5 and a conversion at 600° F (315° C.) of 80.6% after 20 minutes on stream. The data suggests a large pore molecular sieve.

Example 10

Hydrocracking of n-Hexadecane

A 1 gm sample of SSZ-47B (prepared as in Example 3 and treated as in Examples 6 and 7) is suspended in 10 gm de-ionized water. To this suspension, a solution of $Pd(NH_3)_4(NO_3)_2$ at a concentration which would provide 0.5 wt. % Pd with respect to the dry weight of the molecular sieve sample is added. The pH of the solution is adjusted to pH of ~9 by a drop-wise addition of dilute ammonium hydroxide solution. The mixture is then stirred at room temperature for 48 hours. The mixture is then filtered through a glass frit, washed with de-ionized water, and air-dried. The collected Pd-SSZ-47B sample is slowly calcined up to 482° C. in air and held there for three hours.

The calcined Pd/SSZ-47B catalyst is pelletized in a Carver Press and granulated to yield particles with a 20/40 mesh size. Sized catalyst (0.5 g) is packed into a ¼ inch OD tubing reactor in a micro unit for n-hexadecane hydroconversion. The table below gives the run conditions and the products data for the hydrocracking test on n-hexadecane.

| | |
|---|---|
| Temperature | 518° F. |
| Time-on-Stream (hrs.) | 98.6–100.1 |
| WHSV | 1.55 |
| PSIG | 1200 |
| Titrated? | No |
| n-16, % Conversion | 95.5 |
| Hydrocracking Conv. | 75.6 |
| Isomerization Selectivity, % | 20.8 |
| Cracking Selectivity, % | 79.2 |
| $C_{4-}$, % | 17.6 |
| $C_{5+}$ | 60.5 |
| $C_5/C_4$ | 3.5 |
| $C_{5+}C_6/C_5$, % | 36.64 |
| DMB/MP | 0.09 |
| Iso/Normal Ratios | |
| $C_4$ i/n | 4.74 |
| $C_5$ i/n | 3.43 |
| $C_6$ i/n | 2.71 |
| $C_7$ i/n | 4.33 |
| $C_8$ i/n | 6.75 |
| $C_9$ i/n | 5.84 |
| $C_{10}$ i/n | 6.17 |
| $C_{11}$ i/n | 6.22 |
| $C_{12}$ i/n | 6.9 |
| $C_{13}$ i/n | 8.37 |
| $C_4$–$C_{13}$ i/n | 4.5 |
| Yield, % | |
| $C_1$ | 0.07 |
| $C_2$ | 0.11 |
| $C_3$ | 1.88 |
| $C_4$ | 15.69 |
| $C_5$ | 13.09 |
| $C_6$ | 9.34 |
| $C_7$–$C_{13}$ | 38.77 |

What is claimed is:

1. A molecular sieve having a composition, as synthesized and in the anhydrous state, in terms of mole ratios as follows:

| | |
|---|---|
| $YO_2/W_cO_d$ | >15 |
| $M_{2/n}/YO_2$ | 0.01–0.03 |
| $Q/YO_2$ | 0.02–0.05 |
| Amine/$YO_2$ | 0.01–0.05 | wherein Y is silicon, germanium or a mixture thereof; W is aluminum, gallium, iron, boron, titanium, indium, vanadium or mixtures thereof, c is 1 or 2; d is 2 when c is 1 or d is 3 or 5 when c is 2; M is an alkali metal cation, alkaline earth metal cation or mixtures thereof; n is the valence of M; Q is a N-cyclopentyl-1,4-diazabicyclo[2.2.2]octane cation and Amine is an amine too large to fit in the pores of nonasil.

2. A molecular sieve according to claim 1 wherein the amine is also small enough to fit in the pores of the molecular sieve.

3. A molecular sieve according to claim 1 wherein W is aluminum and Y is silicon.

4. A molecular sieve according to claim 3 wherein the amine is also small enough to fit in the pores of the molecular sieve.

5. A molecular sieve according to claim 1 wherein W is boron and Y is silicon.

6. A molecular sieve according to claim 5 wherein the amine is also small enough to fit in the pores of the molecular sieve.

7. A molecular sieve according to claim 1, 2, 3, 4, 5 or 6 wherein the amine is 4,4'-trimethylene dipiperidine.

8. A method of preparing a crystalline material having, after calcination, the X-ray diffraction lines of Table II comprising (1) an oxide of a first tetravalent element and (2) an oxide of a trivalent element, pentavalent element, second tetravalent element which is different from said first tetravalent element or mixture thereof and having a mole ratio of the first oxide to the second oxide greater than 15, said method comprising contacting under crystallization conditions sources of said oxides, an N-cyclopentyl-1,4-diazabicyclo[2.2.2]octane cation and an amine too large to fit in the pores of the molecular sieve nonasil.

9. The method of claim 8 wherein the crystalline material has, after calcination, a micropore volume of at least 0.10 cc/g.

10. The method of claim 8 wherein the crystalline material has, after calcination, a Constraint Index of less than or equal to 2.0.

11. The method according to claim 8 wherein the first tetravalent element is selected from the group consisting of silicon, germanium and combinations thereof.

12. The method according to claim 11 wherein the first tetravalent element is silicon.

13. The method according to claim 8 wherein the trivalent element, pentavalent element or second tetravalent element is selected from the group consisting of aluminum, gallium, iron, boron, titanium, indium, vanadium and combinations thereof.

14. The method according to claim 13 wherein the trivalent element, pentavalent element or second tetravalent element is selected from the group consisting of aluminum, boron, titanium and combinations thereof.

15. A method according to claim 8 wherein the amine is also small enough to fit in the pores of the crystalline material.

16. The method according to claim 15 wherein the first tetravalent element is selected from the group consisting of silicon, germanium and combinations thereof.

17. The method according to claim 16 wherein the first tetravalent element is silicon.

18. The method according to claim 15 wherein the trivalent element, pentavalent element or second tetravalent element is selected from the group consisting of aluminum, gallium, iron, boron, titanium, indium, vanadium and combinations thereof.

19. The method according to claim 18 wherein the trivalent element, pentavalent element or second tetravalent element is selected from the group consisting of aluminum, boron, titanium and combinations thereof.

20. The method of claim 15 wherein the crystalline material has, after calcination, a micropore volume of at least 0.10 cc/g.

21. The method of claim 15 wherein the crystalline material has, after calcination, a Constraint Index of less than or equal to 2.0.

22. The method of claim 8, 15, 11, 13, 14, 12, 16, 18, 19, or 17 wherein the amine is 4,4'-trimethylene dipiperidine.

* * * * *